United States Patent [19]

Atkinson

[11] Patent Number: 4,507,843
[45] Date of Patent: Apr. 2, 1985

[54] CLAMPING ASSEMBLY
[75] Inventor: Gerald O. Atkinson, Pasadena, Tex.
[73] Assignee: Hughes Tool Company, Houston, Tex.
[21] Appl. No.: 448,671
[22] Filed: Dec. 10, 1982
[51] Int. Cl.$^3$ .................... B23B 31/16; B23K 9/00
[52] U.S. Cl. .................... 29/466; 279/1 SJ; 279/110; 279/123
[58] Field of Search ............ 279/1 S, 1 G, 1 ME, 279/123, 110, 111, 114, 115, 116, 119, 120, 1 SJ; 82/2 D; 409/167, 221, 903; 269/63; 29/466

[56] References Cited

U.S. PATENT DOCUMENTS

| | | | |
|---|---|---|---|
| 1,099,227 | 6/1914 | Whiton | 279/110 |
| 3,006,654 | 10/1961 | Benjamin | 279/23 |
| 3,264,904 | 4/1966 | Judge, Jr. | 279/123 |
| 3,873,107 | 3/1975 | Hohwart et al. | 279/123 X |
| 3,907,191 | 9/1975 | Lichte | 228/182 |
| 4,045,646 | 8/1977 | Lichte | 219/121 EM |
| 4,054,772 | 10/1977 | Lichte | 219/121 EM |
| 4,098,448 | 7/1978 | Sciaky et al. | 228/102 |
| 4,209,124 | 6/1980 | Baur et al. | 228/182 |

FOREIGN PATENT DOCUMENTS

| | | | |
|---|---|---|---|
| 2848342 | 5/1980 | Fed. Rep. of Germany | 279/123 |
| 0709268 | 1/1980 | U.S.S.R. | 279/1 S |

*Primary Examiner*—Z. R. Bilinsky
*Attorney, Agent, or Firm*—Robert A. Felsman; H. Dennis Kelly

[57] ABSTRACT

A method and a clamping assembly for securing rock bit sections during welding. The assembly has a chuck jaw that is supported by metal rods, which give the assembly enough resiliency to conform to the shape of the rock bit and which keep the chuck jaw parallel to the base so that the point of engagement between the chuck jaw and the rock bit section remains constant.

5 Claims, 3 Drawing Figures

CLAMPING ASSEMBLY

BACKGROUND OF THE INVENTION

1. Field of the Invention

This invention relates in general to improvements in rock bit assembly and in particular to improvements in securing rock bit sections during welding.

2. Description of the Prior Art

Rotary rock bits used for oil well drilling are commonly manufactured in three sections which are then welded together to form the completed rock bit. During the welding process the rock bit sections are supported and held together by a fixture that includes three clamping jaws, each jaw supporting one rock bit section.

When solid clamping jaws are used, the outer surfaces of the rock bit sections have to be machined to provide an area against which the chuck jaw can contact. U.S. Pat. No. 4,054,772 (Lichte) discloses such a fixture. In order to eliminate the necessity of machining the outer surfaces of the sections, the clamping jaws may be made resilient.

In U.S. Pat. No. 4,098,448 (Sciaky et al.) the desired resiliency was provided by a composite structure of a helical spring and several bellville springs. Unfortunately, the residue given off during the electron beam welding process tends to settle on the sliding surfaces. After the residue builds up sufficiently to restrict movement of the sliding member, the clamping jaw performs like a solid chuck jaw.

BROAD DESCRIPTION OF THE INVENTION

The general object of this invention is to provide a clamping assembly to secure rock bit sections during welding, wherein the chuck jaws are resilient and retain their resiliency in spite of the hardening residue produced during the electron beam welding process. In general this object is accomplished by a clamping assembly in which each chuck jaw is supported by a pair of metal rods fixed to a moveable master jaw.

The master jaws are supported and moved in unison by a self-centering chuck of a type well known in the art. As the master jaw is moved radially inward toward the rock bit section, the chuck jaw contacts the section and the rods bend slightly. The elasticity of the rods gives the chuck jaw a resiliency which allows the jaws to compensate when clamping on surfaces which are not equidistant from the centerline of the chuck, such as clamping on as-forged surfaces on a rock bit section. This eliminates the necessity of machining an area on the outer surface of the rock bit section.

Although one rod alone might be sufficient to support the chuck jaw, the second rod adds support and also acts as a guide means to maintain the chuck jaw parallel to the face of the chuck. This keeps the point of engagement between the chuck jaw and the rock bit section constant, even as the rods bend. By keeping the contact point constant, the clamping assembly maintains a secure grip on the rock bit sections and prevents scraping of the jaw across the section.

Since the rods are fixed to the master jaw at one end, and free but guided at the other end, they act as cantilevers with known formulas for stress and deflection. Therefore, the amount of force necessary to deflect the rods a given distance may be adjusted by changing the length, shape or size of the rods.

The above as well as additional objects, features and advantages of the invention will become apparent in the following detailed description.

DESCRIPTION OF THE PREFERRED EMBODIMENT

Figure 1:
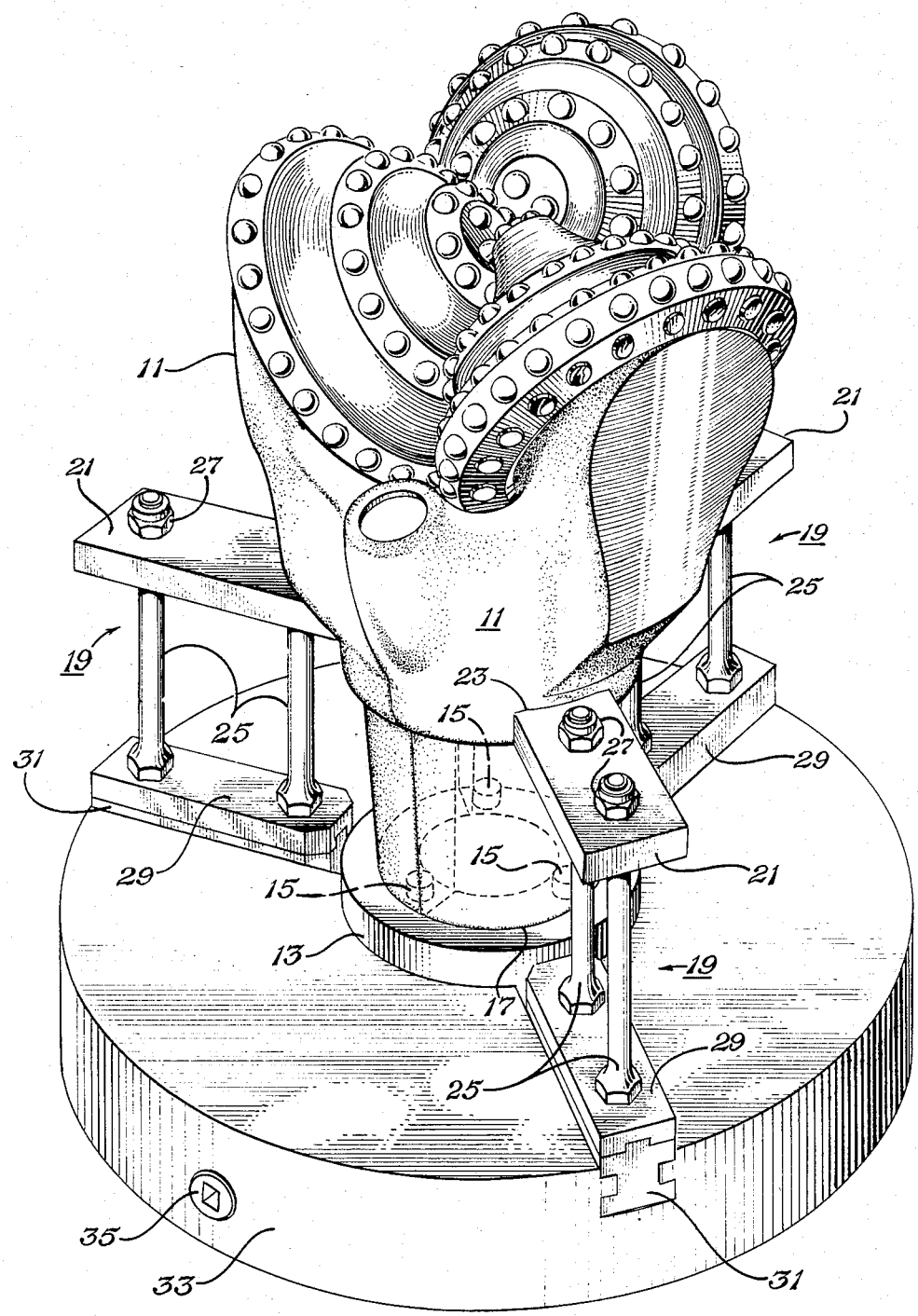
FIG. 1 is a perspective view of three rock bit sections secured by clamping assemblies of the invention.

FIG. 1 shows rock bit sections 11 in position to be welded together to form a completed rock bit. The sections 11 are mounted upon a fixture 13 with three locator dowels 15 in a circular pattern and extending upward from the fixture 13. The sections 11 have dowel holes mating with the dowels 15 as locator means to retain the shank end 17 of the sections 11 in fixed equal vertical and radial positions.

Figure 2:
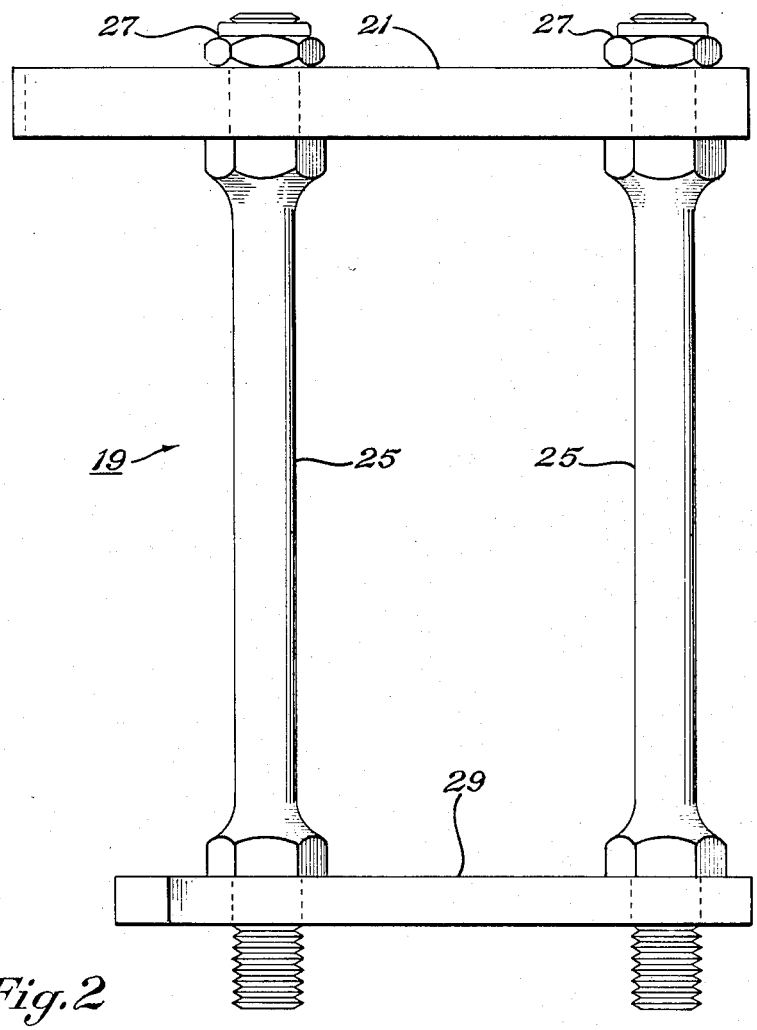
FIG. 2 is a side view of a clamping assembly of the invention.
Figure 3:
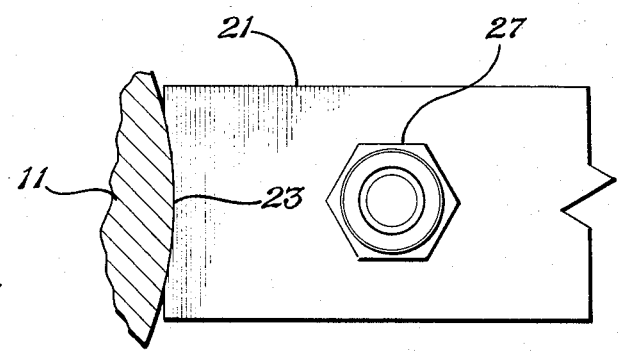
FIG. 3 is a partial top view of a clamping assembly of the invention in contact with a rock bit section.

The rock bit sections are secured by clamping assemblies 19, also shown in FIG. 2. Each clamping assembly 19 has a chuck jaw 21 which engages the rock bit section 11 with a curved contact surface 23, shown most clearly in FIG. 3. Each chuck jaw 21 is supported by a pair of resilient rods 25 which pass through the jaw 21 and are secured by nuts 27. Each rod 25 passes through a cover plate 29 and are affixed to a base or master jaw 31 which is supported and moved by a scroll (not shown) in a self-centering chuck 33. The scroll is moved by a rotation screw 35 which is turned with a chuck wrench (not shown).

In operation the rock bit sections 11 are first placed upon the fixture 13, mating the dowel hole in the shank end 17 of each section 11 with a dowel 15 on the fixture 13. Then the self-centering chuck 33 moves the master jaws 31 radially inward toward the rock bit sections 11 until the contact surfaces 23 of the chuck jaws 21 contact the rock bit sections 11. As the bases 29 continue to move radially inward the rods 25 begin to bend, allowing the chuck jaws 21 to conform to the shape of the rock bit sections 11. This resiliency in the clamping assemblies 19 eliminates the need for machining a flat on the outer surface of the rock bit sections 11 against which the chuck jaws 21 can contact. Moreover, unlike the helical springs used to give resiliency to prior art chuck jaws, the rods 25 of the invention retain their elasticity even when covered with the black residue which is produced during the electron beam welding process.

Another feature of the invention is that the rods 25 guide the chuck jaw 21 so that the jaw 21 remains parallel to the face of the self-centering chuck 33, even as the rods 25 bend. This is a result of the manner in which the rods 25 bend. Because the ends of the rods 25 pass through the chuck jaw 21 and are secured by nuts 27, the ends of the rods 25 remain parallel to one another as the rods 25 bend. The upper ends of the rods 25 also stay parallel with the ends fixed to the master chuck 31, as the rods 25 bend in two places, in an S shape, rather than in a simple arc.

The rods 25 are cantilevers, fixed at one end and free but guided at the other end, so the rods act in accordance with known formulae. Therefore, for a given load on a given rod, the stress in rod 25 and the deflection of the rod can be calculated. The stress in the rod is equal to (Wl/2Z), where W is the load in pounds, l is the length of the rod in inches, and Z is the section modulus of the rod in cubic inches. The section modulus, Z, of a circular rod is $0.098d^3$ where d is the diameter of the rod. For example, if a clamping assembly 19 has two rods 25 which are each 4.4 inches long and $\frac{3}{8}$ inch in diameter, a 500 pound load on the chuck jaw 21 will produce a load on each rod 25 of 250 pounds. The resulting stress in rod 25 would be:

$$\frac{Wl}{2Z} = \frac{250 \times 4.4}{2 \times 0.098(3/8)^3} = 106{,}000 \text{ pounds per square inch}$$

The deflection of the rod 25 at the chuck jaw 21 is equal to $(Wl^3/12EI)$, where E is the modulus of elasticity in pounds per square inch, and I is the moment of inertia in inches$^4$. For a circular steel rod, the modulus of elasticity, E, would be about $30 \times 10^6$ pounds per square inch, and the moment of inertia, I, is $0.049d^4$, where d is the diameter of the rod. For a $\frac{3}{8}$ inch rod therefore, the moment of inertia is 0.00097 inches$^4$. A 500 pound load on a chuck jaw 21 having two $\frac{3}{8}$ inch rods, each 4.4 inches long, would thus deflect the chuck jaw 21 a distance of:

$$\frac{Wl^3}{12EI} = \frac{250 \times 4.4^3}{12 \times 30 \times 10^6 \times 0.00097} = 0.061 \text{ inch}$$

With these formulae an engineer can select rods 25 of a length, shape, and size that will result in the desired deflection of the chuck jaw 21 and stress at the master jaw 31.

I claim:

1. A clamping assembly for securing a rock bit section during welding, said assembly comprising:
   a moveable base;
   a chuck jaw for engaging the rock bit section; and
   a pair of resilient rods attached to the base and to the chuck jaw to form a rectangular structure which is deformable to a generally parallelogram configuration.

2. A clamping assembly for securing a rock bit section during welding, said assembly comprising:
   a moveable base;
   a chuck jaw for engaging the rock bit section;
   a pair of resilient rods attached to the base and to the chuck jaw to form a rectangular structure which is deformable to a generally parallelogram configuration; and
   wherein the rods are spaced apart in a row extending away from the rock bit section.

3. A clamping assembly for securing a rock bit section during welding, said assembly comprising:
   a moveable base;
   a chuck jaw for engaging the rock bit section;
   a pair of resilient rods attached to the base and to the chuck jaw to form a rectangular structure, when the base is in the open position, said structure being deformable to a generally parallelogram configuration; and
   wherein the rods are spaced apart in a row extending away from the rock bit section.

4. A method for securing a rock bit section during welding, comprising the steps of:
   providing a base;
   attaching a pair of resilient rods at one end to the base;
   attaching engaging means to the rods to form a rectangular structure for engaging the rock bit section; and
   moving the base toward the rock bit section until the engaging means engages the rock bit section, deforming the rectangular structure to a generally parallelogram configuration.

5. A method for securing rock bit sections during welding, comprising the steps of:
   attaching a plurality of resilient rods at one end to a plurality of bases;
   attaching chuck jaws to the rods to form rectangular structures for engaging the rock bit sections; and
   moving the bases radially inward toward the rock bit sections until the chuck jaws engage the rock bit sections, deforming the rectangular structures to generally parallelogram configurations.

* * * * *